_(12)_ United States Patent
Overly, III et al.

(10) Patent No.: US 7,767,248 B2
(45) Date of Patent: Aug. 3, 2010

(54) SOFT CHEW CONFECTIONARY WITH HIGH FIBER AND SUGAR CONTENT AND METHOD FOR MAKING SAME

(76) Inventors: Harry J. Overly, III, 8131 Bytham Castle Dr., Huntersville, NC (US) 28078; Mark B. Jones, 118 Heaggans Dr., Cleveland, NC (US) 27013; Lee M. Vickers, 17020G Northstar Dr., Huntersville, NC (US) 28078; Richard C. Zulman, 19010 Mary Ardrey Cir., Cornelius, NC (US) 28031

( * ) Notice: Subject to any disclaimer, the term of this patent is extended or adjusted under 35 U.S.C. 154(b) by 692 days.

(21) Appl. No.: 11/670,769

(22) Filed: Feb. 2, 2007

(65) Prior Publication Data

US 2008/0187647 A1   Aug. 7, 2008

(51) Int. Cl.
*A23G 3/00* (2006.01)
(52) U.S. Cl. ........................ 426/660; 426/572
(58) Field of Classification Search ............... 426/519, 426/520, 571, 660, 648, 572; 424/776
See application file for complete search history.

(56) References Cited

U.S. PATENT DOCUMENTS

| | | | |
|---|---|---|---|
| 4,327,077 A | 4/1982 | Puglia et al. |
| 4,515,769 A | 5/1985 | Merritt et al. |
| 4,545,989 A | 10/1985 | Becker et al. |
| 4,568,560 A | 2/1986 | Schobel |
| 4,582,709 A | 4/1986 | Peters et al. |
| 4,610,871 A | 9/1986 | Lynch |
| 4,698,232 A | 10/1987 | Sheu et al. |
| 4,714,620 A | 12/1987 | Bunick et al. |
| 4,716,033 A | 12/1987 | Denick, Jr. |
| 4,724,136 A | 2/1988 | Scheibl |
| 4,749,575 A | 6/1988 | Rotman |
| 4,753,790 A | 6/1988 | Silva et al. |
| 4,753,800 A | 6/1988 | Mozda |
| 4,758,424 A | 7/1988 | Denick, Jr. et al. |
| 4,758,425 A | 7/1988 | Denick, Jr. et al. |
| 4,761,274 A | 8/1988 | Denick, Jr. et al. |
| 4,767,614 A | 8/1988 | Scarpa et al. |
| 4,778,676 A | 10/1988 | Yang et al. |
| 4,786,511 A | 11/1988 | Huzinec et al. |
| 4,800,087 A | 1/1989 | Mehta |
| 4,818,539 A | 4/1989 | Shaw et al. |
| 4,832,971 A | 5/1989 | Michnowski |
| 4,851,392 A | 7/1989 | Shaw et al. |
| 4,859,475 A | 8/1989 | Michnowski |
| 4,879,108 A | 11/1989 | Yang et al. |
| 4,882,151 A | 11/1989 | Yang et al. |
| 4,882,152 A | 11/1989 | Yang et al. |
| 4,882,153 A | 11/1989 | Yang et al. |
| 4,882,154 A | 11/1989 | Yang et al. |
| 4,882,155 A | 11/1989 | Yang et al. |
| 4,882,156 A | 11/1989 | Yang et al. |
| 4,882,157 A | 11/1989 | Yang et al. |
| 4,882,158 A | 11/1989 | Yang et al. |
| 4,882,159 A | 11/1989 | Yang et al. |
| 4,882,160 A | 11/1989 | Yang et al. |
| 4,911,937 A | 3/1990 | Crosello et al. |
| 4,929,508 A | 5/1990 | Sharma et al. |
| 4,935,242 A | 6/1990 | Sharma et al. |
| 5,002,970 A | 3/1991 | Eby, III |
| 5,013,557 A | 5/1991 | Tai |
| 5,013,716 A | 5/1991 | Cherukuri et al. |
| 5,084,278 A | 1/1992 | Mehta |
| 5,095,035 A | 3/1992 | Eby, III |
| 5,182,114 A | 1/1993 | Blaser et al. |
| 5,266,334 A | 11/1993 | Phadke et al. |
| 5,320,848 A | 6/1994 | Geyer et al. |
| 5,476,678 A | 12/1995 | Walter et al. |
| 5,552,152 A | 9/1996 | Shen |
| 5,578,336 A | 11/1996 | Monte |
| 5,587,198 A | 12/1996 | Cherukuri et al. |
| 5,637,313 A | 6/1997 | Chau et al. |
| 5,641,759 A | 6/1997 | Patterson et al. |
| 5,660,872 A | 8/1997 | Van Loo et al. |
| 5,707,999 A | 1/1998 | Cavallini |
| 5,725,865 A | 3/1998 | Mane et al. |
| 5,843,466 A | 12/1998 | Mane et al. |
| 5,858,344 A | 1/1999 | Muller et al. |
| 5,879,699 A | 3/1999 | Lerner |
| 5,900,261 A | 5/1999 | Ribadeau-Dumas et al. |

(Continued)

FOREIGN PATENT DOCUMENTS

DE          3414743          1/1986

(Continued)

OTHER PUBLICATIONS

U.S. Appl. No. 11/983,084, filed Nov. 2006, Willams.*

*Primary Examiner*—Keith D Hendricks
*Assistant Examiner*—Katherine Deguire
(74) *Attorney, Agent, or Firm*—Fitch, Even, Tabin & Flannery

(57) ABSTRACT

The confectionary product described herein has an enhanced solids and fiber content and the method described herein permits higher loading of fiber, sweetener and other solids in a soft chewy confectionary product. In another aspect, the product and method contemplate high loading fiber, solids and sweetener where the sweetener masks poor tasting active ingredients, such a vitamins and minerals.

14 Claims, 1 Drawing Sheet

U.S. PATENT DOCUMENTS

| | | | |
|---|---|---|---|
| 5,912,007 A | 6/1999 | Pan et al. |
| 5,928,664 A | 7/1999 | Yang et al. |
| 5,965,162 A | 10/1999 | Fuisz et al. |
| 6,017,567 A | 1/2000 | Rosenplenter |
| 6,060,078 A | 5/2000 | Lee |
| 6,143,335 A | 11/2000 | McKenzie |
| 6,224,904 B1 | 5/2001 | Rapp et al. |
| 6,235,318 B1 | 5/2001 | Lombardy, Jr. et al. |
| 6,261,600 B1 | 7/2001 | Kirschner et al. |
| 6,280,769 B1 | 8/2001 | D'Amelia et al. |
| 6,350,469 B1 | 2/2002 | Daggy et al. |
| 6,352,974 B1 | 3/2002 | Chirri et al. |
| 6,365,209 B2 | 4/2002 | Cherukuri |
| 6,372,253 B1 | 4/2002 | Daggy et al. |
| 6,372,271 B1 | 4/2002 | Fritzsching et al. |
| 6,387,381 B2 | 5/2002 | Christensen |
| 6,391,375 B1 | 5/2002 | Fone |
| 6,399,142 B1 | 6/2002 | Silver |
| 6,419,978 B1 | 7/2002 | Silver |
| 6,426,090 B1 | 7/2002 | Ream et al. |
| 6,432,457 B1 | 8/2002 | Jones |
| 6,432,460 B1 | 8/2002 | Zietlow et al. |
| 6,440,450 B1 | 8/2002 | Han et al. |
| 6,444,218 B2 | 9/2002 | Han et al. |
| 6,455,068 B1 | 9/2002 | Licari |
| 6,479,071 B2 | 11/2002 | Holme et al. |
| 6,482,465 B1 | 11/2002 | Cherukuri et al. |
| 6,511,679 B2 | 1/2003 | D'Amelia et al. |
| 6,517,886 B1 | 2/2003 | Chau et al. |
| 6,521,247 B1 | 2/2003 | deVries |
| 6,555,145 B1 | 4/2003 | Cherukuri |
| 6,558,722 B2 | 5/2003 | Corriveau et al. |
| 6,569,488 B2 | 5/2003 | Silver |
| 6,592,896 B2 | 7/2003 | Rosenbloom |
| 6,602,518 B2 | 8/2003 | Seielstad et al. |
| 6,623,772 B1 | 9/2003 | Defilippi |
| 6,667,050 B1 | 12/2003 | Boissonneault et al. |
| 6,673,380 B2 | 1/2004 | Yang et al. |
| 6,685,916 B1 | 2/2004 | Holme et al. |
| 6,696,044 B2 | 2/2004 | Luo et al. |
| 6,706,277 B2 | 3/2004 | Day et al. |
| 6,719,996 B2 | 4/2004 | Kuentz et al. |
| 6,723,358 B1 | 4/2004 | van Lengerich |
| 6,740,350 B2 | 5/2004 | Pfeiffer |
| 6,759,079 B2 | 7/2004 | Klug et al. |
| 6,770,308 B2 | 8/2004 | Selestad et al. |
| 6,793,953 B2 | 9/2004 | Zietlow et al. |
| 6,805,883 B2 | 10/2004 | Chevaux et al. |
| 6,821,535 B2 | 11/2004 | Nurmi et al. |
| 6,827,945 B2 | 12/2004 | Rosenbloom |
| 6,841,178 B2 | 1/2005 | Cupp et al. |
| 6,849,289 B2 | 2/2005 | Lefebvre et al. |
| 6,881,419 B2 | 4/2005 | Lovett |
| 6,890,567 B2 | 5/2005 | Nakatsu et al. |
| 6,894,077 B2 | 5/2005 | Suzuki et al. |
| 6,904,870 B2 | 6/2005 | Russell-Maynard et al. |
| 6,982,093 B2 | 1/2006 | Licari |
| 7,008,648 B2 | 3/2006 | Corley et al. |
| 7,022,364 B1 | 4/2006 | De Meuter et al. |
| 7,067,150 B2 | 6/2006 | Farber et al. |
| 7,108,886 B2 | 9/2006 | De Meuter et al. |
| 7,125,562 B2 | 10/2006 | Daggy et al. |
| 7,318,920 B2 | 1/2008 | Christensen |
| 7,387,803 B2 | 6/2008 | Licari |
| 7,452,553 B2 | 11/2008 | Licari |
| 7,521,072 B2 | 4/2009 | Licari |
| 2001/0018084 A1 | 8/2001 | Nurmi et al. |
| 2001/0021404 A1 | 9/2001 | Uhlemann et al. |
| 2001/0043907 A1 | 11/2001 | Luo et al. |
| 2002/0025360 A1 | 2/2002 | Yang et al. |
| 2002/0028276 A1 | 3/2002 | Rapp et al. |
| 2002/0064505 A1 | 5/2002 | Rosenberg |
| 2002/0064584 A1 | 5/2002 | Kealey et al. |
| 2002/0098157 A1 | 7/2002 | Holme et al. |
| 2002/0110531 A1 | 8/2002 | Faust et al. |
| 2002/0110581 A1 | 8/2002 | Ream et al. |
| 2002/0122842 A1 | 9/2002 | Seielstad et al. |
| 2002/0159955 A1 | 10/2002 | Luo et al. |
| 2002/0187179 A1 | 12/2002 | Page et al. |
| 2002/0187223 A1 | 12/2002 | McIver et al. |
| 2003/0017202 A1 | 1/2003 | Bunick et al. |
| 2003/0018063 A1 | 1/2003 | Zenovich et al. |
| 2003/0022912 A1 | 1/2003 | Martino et al. |
| 2003/0026826 A1 | 2/2003 | Cherukuri et al. |
| 2003/0026878 A1 | 2/2003 | Corriveau et al. |
| 2003/0039687 A1 | 2/2003 | Corbo et al. |
| 2003/0049303 A1 | 3/2003 | Ning et al. |
| 2003/0072720 A1 | 4/2003 | Nevo |
| 2003/0086960 A1 | 5/2003 | Seielstad et al. |
| 2003/0104099 A1 | 6/2003 | Lee et al. |
| 2003/0113274 A1 | 6/2003 | Holme et al. |
| 2003/0124064 A1 | 7/2003 | Luo et al. |
| 2003/0129143 A1 | 7/2003 | Lawlor |
| 2003/0129217 A1 | 7/2003 | Festo |
| 2003/0130229 A1 | 7/2003 | Buono et al. |
| 2003/0138520 A1 | 7/2003 | Bell et al. |
| 2003/0175216 A1 | 9/2003 | Rosenberg |
| 2003/0175326 A1 | 9/2003 | Thombre |
| 2003/0185884 A1 | 10/2003 | Singh et al. |
| 2003/0185912 A1 | 10/2003 | Rosenbloom |
| 2003/0190355 A1 | 10/2003 | Hermelin et al. |
| 2003/0190397 A1 | 10/2003 | Serpelloni |
| 2004/0033288 A1 | 2/2004 | Song et al. |
| 2004/0071681 A1 | 4/2004 | Muller |
| 2004/0136928 A1 | 7/2004 | Holme et al. |
| 2004/0137111 A1 | 7/2004 | Yang et al. |
| 2004/0141927 A1 | 7/2004 | Johnson et al. |
| 2004/0166157 A1 | 8/2004 | Thombre |
| 2004/0175489 A1 | 9/2004 | Clark et al. |
| 2004/0191322 A1 | 9/2004 | Hansson |
| 2004/0208977 A1 | 10/2004 | Chien et al. |
| 2004/0213829 A1 | 10/2004 | Coleman et al. |
| 2004/0228931 A1 | 11/2004 | Chokshi et al. |
| 2004/0241208 A1 | 12/2004 | Sowden et al. |
| 2004/0253189 A1 | 12/2004 | Maxwell et al. |
| 2004/0253190 A1 | 12/2004 | Maxwell et al. |
| 2004/0253191 A1 | 12/2004 | Maxwell et al. |
| 2004/0253192 A1 | 12/2004 | Maxwell et al. |
| 2004/0253278 A1 | 12/2004 | Maxwell et al. |
| 2004/0258733 A1 | 12/2004 | Maxwell et al. |
| 2005/0008582 A1 | 1/2005 | Du-Thumm et al. |
| 2005/0008732 A1 | 1/2005 | Gebreselassie et al. |
| 2005/0069608 A1 | 3/2005 | Hendricks |
| 2005/0079245 A1 | 4/2005 | De Meuter et al. |
| 2005/0084551 A1 | 4/2005 | Jensen et al. |
| 2005/0089560 A1 | 4/2005 | Daggy et al. |
| 2005/0089561 A1 | 4/2005 | Daggy et al. |
| 2005/0089562 A1 | 4/2005 | Daggy et al. |
| 2005/0089563 A1 | 4/2005 | Daggy et al. |
| 2005/0089564 A1 | 4/2005 | Daggy et al. |
| 2005/0089565 A1 | 4/2005 | Daggy et al. |
| 2005/0100638 A1 | 5/2005 | Kligerman et al. |
| 2005/0100640 A1 | 5/2005 | Pearce |
| 2005/0112149 A1 | 5/2005 | Belote et al. |
| 2005/0118326 A1 | 6/2005 | Anfinsen et al. |
| 2005/0130912 A1 | 6/2005 | Park et al. |
| 2005/0142194 A1 | 6/2005 | Nocelli et al. |
| 2005/0152972 A1 | 7/2005 | Singh |
| 2005/0163886 A1 | 7/2005 | Song et al. |
| 2005/0175675 A1 | 8/2005 | Seibertz |
| 2005/0186252 A1 | 8/2005 | Ahlgren et al. |
| 2005/0191406 A1 | 9/2005 | Alexander et al. |
| 2005/0201952 A1 | 9/2005 | Sharma |
| 2005/0203057 A1 | 9/2005 | Sharma |

| | | |
|---|---|---|
| 2005/0207993 A1 | 9/2005 | Bazemore et al. |
| 2005/0220940 A1 | 10/2005 | Fairs et al. |
| 2005/0226908 A1 | 10/2005 | Huron et al. |
| 2005/0226990 A1 | 10/2005 | Pellecer et al. |
| 2005/0232989 A1 | 10/2005 | Piene et al. |
| 2006/0024352 A1 | 2/2006 | Poxon et al. |
| 2006/0024353 A1 | 2/2006 | Trouve et al. |
| 2006/0024384 A1 | 2/2006 | Giordano |
| 2006/0024409 A1 | 2/2006 | Giordano |
| 2006/0051475 A1 | 3/2006 | Fornaguera et al. |
| 2006/0067922 A1 | 3/2006 | Christensen |
| 2006/0078508 A1 | 4/2006 | Gebreselassie et al. |
| 2006/0078509 A1 | 4/2006 | Gebreselassie et al. |
| 2006/0099308 A1 | 5/2006 | Zuehlke et al. |
| 2006/0121092 A1 | 6/2006 | Ream et al. |
| 2006/0121093 A1 | 6/2006 | Ream et al. |
| 2006/0127324 A1 | 6/2006 | Luo |
| 2006/0127451 A1 | 6/2006 | Augello et al. |
| 2006/0127452 A1 | 6/2006 | Muller |
| 2006/0134183 A1 | 6/2006 | Huetter et al. |
| 2006/0141009 A1 | 6/2006 | Huron et al. |
| 2006/0147500 A1 | 7/2006 | Klingeberg et al. |
| 2007/0009647 A1 | 1/2007 | Huetter et al. |
| 2008/0187647 A1 | 8/2008 | Overly et al. |

FOREIGN PATENT DOCUMENTS

| | | |
|---|---|---|
| EP | 0061710 | 10/1982 |
| EP | 0075443 | 3/1983 |
| EP | 0813817 | 12/1997 |
| EP | 1447094 | 8/2004 |
| GB | 2115672 | 9/1983 |
| JP | 3058936 | 3/1991 |
| JP | 4281748 | 10/1992 |
| JP | 5304893 | 11/1993 |
| JP | 10056986 | 3/1998 |
| JP | 2001045976 | 2/2001 |
| WO | 1991009989 | 7/1991 |
| WO | 2003002099 | 1/2003 |
| WO | 2003092400 | 11/2003 |
| WO | 2003/105882 A1 | 12/2003 |
| WO | 2004014143 | 2/2004 |
| WO | 2004/022074 A1 | 3/2004 |
| WO | 2004049817 | 6/2004 |
| WO | 2005/056023 A1 | 6/2005 |
| WO | 2005/079603 A1 | 9/2005 |
| WO | WO 2008/057571 * | 11/2006 |

* cited by examiner

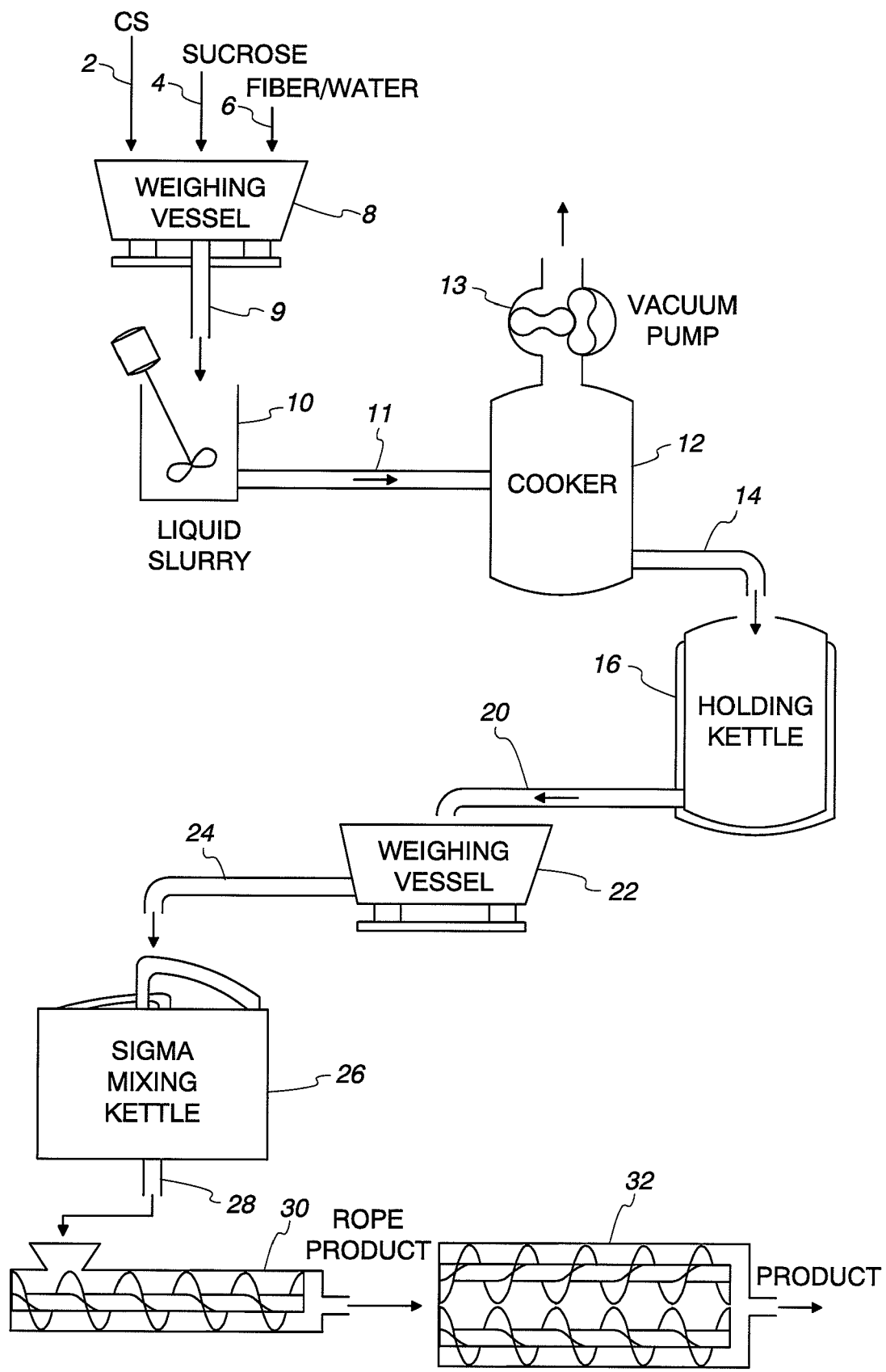

SOFT CHEW CONFECTIONARY WITH HIGH FIBER AND SUGAR CONTENT AND METHOD FOR MAKING SAME

FIELD

This invention is generally directed to a soft and chewy confectionary with a high fiber content and high solids. A method also is described for making the product where the method permits loading large amounts of fiber and solids into the product while maintaining a desired mouth feel, taste and other organoleptic properties of the product.

BACKGROUND

Most dieticians agree that dietary fiber promotes good health. Most people in the United States do not ingest sufficient fiber in their daily diet; hence, extra fiber per day needs to be ingested to meet daily health needs. Fiber supplements to complement daily diet fiber requirements are known, but often are not palatable. They often have to be taken as a water slurry which may be viscous or bad tasting. Food or confectionary supplements also are known, but the fiber and solids content of these supplements is often low, or if high in fiber and/or solids have a poor taste, poor mouth feel and/or other undesirable organoleptics.

U.S. Pat. No. 6,540,350 to Pfeiffer describes making a cooked fiber confectionary product; but generally with very high fiber content, the product admittedly was judged to be unacceptable. Moreover, the product strictly required a balance of reducing and non-reducing sugars for acceptability. To make the product, the patent describes making a premix of fat and carbohydrate sugars, cooking the premix at 105-132° C. and then later trying to load the cooked premix with fiber by mixing the warmed cooked premix with the fiber. That could prove difficult and limited the maximum amount of fiber that could be put into the confectionary.

U.S. Pat. No. 6,517,886 to Chau et al. also describes making a confectionary with dietary fiber where the confection includes a saccharide component, a hydrated hydrobinding component (e.g. corn syrup rice syrup, fructose syrup), and a fat component. The point of Chau is that the confectionary is uncooked and does not require heating to remove water.

OBJECTS

It is an object to provide a high fiber soft chew confectionary with exceptional mouth feel and taste characteristics.

It is another object to provide a method for making a high fiber soft chew confectionary without driving off large amounts of water during the process and without risking burning sugars and other ingredients during the process.

It is another object to increase the fiber content and solids content of a confectionary product by loading the fiber and solids in at least two stages, during and after a cooking stage, where cooking creates a fiber concentrate which then is further loaded with fiber and other ingredients.

These and other objects will become apparent by reference to the following.

SUMMARY

The confectionary product described herein has an enhanced fiber and solids content and the method described herein permits higher loading of water soluble or swellable fiber as well as sweetener in a soft chewy confectionary product. In another aspect, the product and method contemplate the high loading of fiber and solids including sweetener where the sweetener masks poor tasting active ingredients (which may include mineral solids), such vitamins and minerals. According to the method described herein, corn syrup, a non-invert sugar such as sucrose, glucose, mannose, galactose, ribose, lactose and maltose among others, and a warmed fiber/water blend are blended to provide a corn syrup/fiber/sucrose slurry having at least about 20 weight percent (dry basis) fiber, generally from about 25 to about 40 weight percent fiber, and at least 60 weight percent solids, generally from about 60 to about 74 weight percent solids. Sucrose is a preferred sweetener/sugar. But sugar alcohols may be used as sweeteners in lieu of corn syrup and sugars/carbohydrates. Water in the slurry hydrates and stabilizes the fiber to which the water is bound. The combination of corn syrup and sweetener should comprise from about 60 to about 75 weight percent (dry basis), and preferably from about 55-75 weight percent (dry basis), of the slurry. Corn syrup comprises from about 50 to about 70 weight percent (dry basis), preferably from about 55 to about 70 weight percent (dry basis) of the corn syrup/sweetener combination.

The aqueous slurry, which has at least about 20 weight percent fiber on a dry basis and at least about 60 weight percent solids, then is transported to a cooker where the fiber is further bound to water and some unbound water is removed to provide a post cooked soft chew intermediate product. During cooking sufficient amounts of unbound water are removed to permit the further post cook addition of fiber, sweetener and other solids, yet retain the organoleptic properties of a final soft chew confectionary product which will have a fiber content of 10 to 60 weight percent (dry basis), 10 to 20 weight percent (dry basis) corn syrup, 5 to 20 weight percent (dry basis) sweetener (other than corn syrup) and 88 to 94 weight percent solids. As previously noted, sugar alcohols may be used as sweeteners in lieu of corn syrup and sugars/carbohydrates. Generally, the slurry is cooked at about 105° C. to about 115° C. at atmospheric pressure for a time which is effective for providing a confectionary product with a fiber, corn syrup, sweetener and solids content as previously described. Generally cooking the product at 105° C. to about 115° C. for about 30 to about 90 seconds is effective to remove at least 40 weight percent and generally from about 40 to about 70 weight percent water from the slurry. This provides a cooked slurry having at least about 78 weight percent, and generally from about 80 weight percent to about 88 weight percent solids, preferably from about 80 to about 85 weight percent solids. Alternatively, the product may be cooked at about 95° C. to about 105° C. at 23 to 27 inches of mercury for 30 to 90 seconds. The use of the lower temperatures under a vacuum is ideal for more delicate flavors, such as fruit flavors, and softer textures. The vacuum cooking permits lower temperatures which helps in handling the product in post cook processing.

After cooking, additional fiber and other solids (such as corn syrup and sweetener other than corn syrup) are blended with the cooked slurry along with a humectant and additional optional active and other ingredients, such as fat, vitamins and minerals, e.g. calcium carbonate. The temperature at which the additional fiber and additional solids, active and other ingredients are blended is relatively high to substantially preclude formation of a crystalline matrix of sugar, corn syrup and fiber which will provide an overly firm product and which will adversely affect further processing of extrusion and packaging. This is important because the crystalline matrix of the product will begin to form if the product is too cool, resulting in an extremely firm mass which can not proceed through the rest of the process of extrusion and packaging. Generally the mixing is done at a temperature of at least about 100° F., and generally from about 110° F. to about 140° F. for about 9 to about 16 minutes, and preferably about 12 minutes. From about 25 to about 40 weight percent fiber (based upon the total fiber dry basis in the finished product) is added during the post cook mixing.

After the mixing at elevated temperatures, the mixed product mass with additional fiber and active ingredients is conveyed through an extruder where it undergoes further mixing with shear which keeps the product malleable for subsequent packaging. Generally after mixing, the mixed product has at least 10 weight percent fiber (dry basis), generally from about 10 to 60 weight percent (dry basis) fiber, preferably at least about 42 weight percent (dry basis) fiber, at least 5 weight percent sweetener generally from 5 to 20 weight percent (dry basis) sweetener (other than corn syrup), from 10 to 20 weight percent (dry basis) corn syrup, at least 3 weight percent and generally from 3 to 6 weight percent (dry basis) humectant, preferably 4.5 weight percent humectant, from 6 to 12 weight percent water, from 6.5 to 10 weight percent (dry basis) fat and at least 88 weight percent solids, and generally from about 88 to about 94 weight percent solids. In an important aspect, the additional fiber and active ingredients are blended into the cooked aqueous slurry with a sigma mixer.

After mixing the product is extruded through a die where the product has a temperature range of from about 80° F. to about 130° F. Extrusion improves the mixing of the product without adversely affecting the fiber in the product. The extruded product does not have a water activity over 60 weight percent free water (which is not bound to the product as water of hydration), and generally from about 30 to about 55 weight percent free water, with not more than about 45 weight percent being preferred.

The method (whether a part of a continuous or batch process) permits higher loading of fiber and other solids compared to other cooked products, yet also maintains excellent organoleptic properties and taste. Higher loading of fiber and solids is permitted because of their staged addition and because the heating/cooking of the fiber/sugar/water slurry stabilizes the fiber as the fiber hydrates and binds to water. This hydration of the fiber permits the delayed addition of additional fiber and sugar with the retention of mouth feel, organoleptic properties, and taste. Too much water added at the cooking stage to hydrate the fiber in contemplation of adding more fiber post cooking, will inhibit the ability to properly remove water in a continuous process system. This over hydration causes loss of desired texture in the final soft chew product. Over hydration with heating causes the loss of the water-solids ratios which over hydration will provide an organoleptically unacceptable soft chewy confectionary product. The process described herein provides for some post cooked unbound water that is carried to post cooking processing. This post cook processing includes the addition of fiber, sweetener, solids and other additional ingredients which includes actives such as vitamins and minerals. Residual post cook unbound water permits the addition and hydration of fiber, further addition of sweetener and solids, the addition of fats, the addition of one or more water scavengers in the form of a humectant such as glycerin and the addition of flavoring agents. As a result a preferred product having at least about 42 weight percent (dry basis) fiber and at least 88 weight percent solids can be obtained without burning or otherwise adversely affecting the product. Moreover the process described herein maintains product properties, but does not require the addition of gums or cellulose processing aids to provide the final product with its desired soft chew texture.

In another aspect, the process can be made continuous and without batching. In this aspect, the corn syrup, sweetener and the fiber/water blend are weighed and added to a vessel which mixes the ingredients to provide the aqueous slurry having at least about 20 weight percent fiber, generally from about 25 to about 40 weight percent fiber, and at least 60 weight percent solids, generally from about 60 to about 74 weight percent solids. As with the process described above, water in the slurry hydrates and stabilizes the fiber to which water is bound. The combination of corn syrup and sweetener should comprise from about 75 to about 60 weight percent (dry basis), and preferably about 55 to about 65 weight percent, of the slurry. Corn syrup comprises from about 50 to about 70 weight percent (dry basis), preferably from about 55 to 65 weight percent (dry basis) of the corn syrup/sweetener combination. The aqueous slurry is continuously moved into a cooker where the slurry is heated to at least about 100° C. generally at about 105° C. to about 115° C. at atmospheric pressure for a time which is effective for providing a confectionary product with a fiber, corn syrup and sweetener content as previously described. Generally cooking the product at 105° C. to about 115° C. under for about 30 to about 90 seconds removes at least 10 weight percent and generally from about 10 to about 20 weight percent water from the slurry.

The cooked slurry is continuously moved from the cooker to cool to not less than about 65° C. to about 82° C. to provide a cooled cooked slurry. The cooked or cooled slurry may be held in a holding vessel in contemplation of moving the cooled slurry into a weighing and/or mixing vessel for mixing with additional fiber, other solids and other ingredient. In any event, the cooled slurry is mixed at elevated temperatures of at least about 100° F., and generally from about 110° F. to about 140° F. with additional fiber, sugar, fat, and humectant to provide a mixed product having from about 10 to 60 weight percent (dry basis) fiber, preferably about 42 weight percent (dry basis) fiber, at least 5 weight percent and generally from 5 to 20 weight percent (dry basis) sweetener (other than corn syrup), from 10 to 20 weight percent corn syrup, at least 3 weight percent and generally from 3 to 6 weight percent (dry basis) humectant, preferably 4.5 weight percent humectant, from 6 to 12 weight percent water, from 6.5 to 10 weight percent (dry basis) fat and at least 88 weight percent and generally from about 88 to about 94 weight percent solids. In the continuous process, as with the process described above, from about 25 to about 40 weight percent fiber (based upon the total fiber dry basis in the finished product) is added during the post cook mixing.

The water activity of the product ($A_w$) is less than 0.7. The process avoids driving off lots of water at the end of the process. Driving off water after fiber, sucrose and dry ingredients are added risks burning the product and creating an undesirable texture in the product.

BRIEF DESCRIPTION OF THE DRAWING

FIG. 1 provides a flow diagram illustrating the general process of the invention for making the confectionary product having a high fiber content.

DETAILED DESCRIPTION

As used herein, water activity, Aw, is equal to Equilibrium Relative Humidity (ERH) divided by 100. ERH is the equilibrium state at which the confectionery product neigher absorbs nor loses moisture to the environment.

Dextrose equivalent (DE) is the percent of reducing sugars on a dry basis calcuated as dextrose. The higher the DE, the sweeter the sugar.

Soft chew is intended to mean a product which is solid at room temperature and which are soft to chew and which is functionally chewy because the product has some plastic texture during the process of mastication in the mouth.

The dietary fiber used herein is water soluble dietary fiber which is water swellable or water soluble. Fibers which may be used include arabinoglactan, polycarbophil, calcium polycarbophil, fibersol, inulin, methylcellulose, and psyllium.

As can be seen in FIG. 1, the method for making the confectionary product with a high fiber and high sucrose content is begun by feeding and blending corn syrup 2 having from about 40 to about 60 DE (and having from about 79 to about 82 weight percent solids), preferably about 42-43 DE, a 20 to 50 weight % sucrose solution (based upon dry sucrose) 4 and a warmed aqueous slurry of swellable or water soluble dietary fiber 6 having a temperature of 55° to 60° C. into a weighing vessel 8. The warmed blended slurry has at least about 20 weight percent (dry basis) fiber, generally from about 25 to about 40 weight percent (dry basis) fiber, and at least 60 weight percent solids, generally from about 60 to about 74 weight percent solids. The combination of corn syrup and sweetener comprises from about 75 to about 60 weight percent (dry basis), and preferably about 65 weight percent, of the slurry. Corn syrup comprises from about 50 to about 70 weight percent dry basis), preferably about 55-65 weight percent (dry basis) of the corn syrup/sweetener combination The corn syrup, sucrose, fiber and water are moved from the weighing vessel into a slurrying tank 10 through line 9 where the ingredients are blended to the aforedescribed solids level. Generally, when the sweetener is sucrose, the slurry is made from blending the corn syrup, sucrose and a warmed 50 weight percent/50 weight percent fiber and water blend. Preferably the corn syrup has a DE of about 42-43 and about 80 weight percent solids level. In an important aspect, when the sweetener is sucrose, the sweetener/water blend mixed with the fiber and corn syrup comprises about 30 weight percent sweetener on a dry basis, the remainder being water. The corn syrup and sweetener combination should comprise from about 60 to about 75 weight percent (dry basis) of the corn syrup/liquid sucrose portion of the slurry, and, in an important aspect, about 55-60 weight percent, of the corn syrup/liquid sucrose/fiber aqueous slurry. The corn syrup comprises from about 50 to about 70 weight percent (wet basis), preferably 55-65 weight percent, of the corn syrup/sucrose combination.

The slurry is continuously fed from the slurry tank to a cooker 12 through line 11. This slurry has at least about 60 weight percent solids, generally from about 60 to 74 weight percent solids. The slurry is cooked at 105° C. to about 115° C. for about 30 to about 90 seconds and is effective to remove at least 10 weight percent and generally from about 10 to about 20 weight percent water from the slurry. This cooking drives off water and hydrates the fiber in the slurry such that the resulting cooked slurry has at least about 78 weight percent solids, generally from about 80 to 88, and preferably about 80-85 weight percent solids. After water is driven from the slurry, the cooked product is a hydrated fiber concentrate or cooked slurry which is continuously fed from the cooker 12 via line 14 to a holding tank 16 where the cooked slurry is cooled to 65° C. to 82° C. The process is continuous up to the time it is conveyed into the holding tank where it can, if desired be held in contemplation of mixing it with additional ingredients. Hence, as the term is used herein, "continuous process" would permit holding product in the holding tank.

The process permits cooking in one cooker continuously. Hence, the process of the invention permits consistent product control with later mixing in more than one sigma mixer and extruder. Cooking provides needed moisture control to provide a base cooked product which then can be used to provide a final product with varying high solids and fiber content through controlling the latter at the point when solids and fiber are added when the product is mixed at the sigma mixer. After cooling the cooled cooked slurry is fed into weighing vessel 22 via line 20 or fed at a given rate via line 24 into a sigma mixing kettle 26 (also known as a Z mixer) where additional fiber, sucrose, corn syrup, flavors, humectant, fat and other solids are added. The mixing and addition of the additional ingredients is done at from about 100° F. to about 140° F. for about 9 to about 16 minutes. During this sigma mixing, from about 25 to about 40 weight percent (dry basis) fiber (based upon the total fiber in the finished product) is added. The mixed product has about 10 to 50 weight percent (dry basis) fiber, preferably about 42-60 weight percent (dry basis) fiber, at least 5 weight percent sweetener and generally from 5 to 20 weight percent (dry basis) sweetener (other than corn syrup), from 10 to 20 weight percent (dry basis) corn syrup, at least 3 weight percent and generally from 3 to 6 weight percent (dry basis) humectant, preferably 4.5 weight percent humectant, from 6 to 12 weight percent water, from 6.5 to 10 weight percent (dry basis) fat and at least 88 weight percent, and generally from about 88 to about 94 weight percent solids.

The humectant is important to hold water to the fiber— holds hydration of and makes the confectionary product stable to extend shelf life of the product.

After mixing the product is conveyed via line 28 to a pre extruder 30 where the product is further mixed and extruded into a 3 inch diameter rope after which it is conveyed to an extruder where the rope like product is brought to a temperature of 80° F. to 120° F. and is further mixed in a double screw extruder 32. As the product emerges from the die, it is cooled, cut and then wrapped as individual pieces and packaged.

The following are non-limiting examples which show how the invention may be practiced.

EXAMPLE

| Fiber Chew - Chocolate | | |
|---|---|---|
| Piece Breakdown | | |
| Ingredient | Amt/Pc | PC % |
| 6X Sugar | 0.000 | 0.00% |
| Surcose | 0.586 | 12.73% |
| Corn Syrup 42 DE | 0.705 | 15.33% |
| Fiber | 2.001 | 43.49% |
| Water | 0.380 | 8.26% |
| Formulation - Chocolate | | |
| | Batch Formula | |
| Ingredient | Amt (lbs) | % |
| 6X Sugar | 0.00 | 0.000% |
| Syrup Blend | 768.97 | 54.823% |
| Water | 0.00 | 0.000% |
| Glycerine 99% - humectant | 56.53 | 4.030% |
| Sucralose | 0.18 | 0.013% |
| Flavoring and Artificial Sweetener | 10.38 | 0.74% |
| Sodium Chloride/Salt | 5.52 | 0.394% |

| Fiber Chew - Chocolate | | |
|---|---|---|
| Fat Blend | 211.08 | 15.048% |
| Corn Starch (process aid) | 0.00 | 0.000% |
| Fiber | 350.00 | 24.953% |
| Total | 1402.645294 | 100.000% |

Batch Size = 4000

| Syrup Blend | | |
|---|---|---|
| Ingredient | Amt | Wet % |
| Liquid Sucrose | 266.5 | 25.8189% |
| Corn Syrup 42 DE | 266.5 | 32.2011% |
| Water | 180 | 20.99% |
| Fiber | 260 | 20.99% |
| Total | 973 | 100.00% |

Blending and cooking:
1. Dissolve fiber in syrup blend water.
2. Add fiber solution to sucrose/corn syrup.
3. Cook to Post Cook Target Solids.
4. Transfer cooked mass to sigma water, allowing mixture to cool to approximately 82° C.
5. Add fat blend, mix appropriately 5 minutes.
6. Add powdered ingredients, mix approximately 5 minutes - fiber, salt & sweeteners.
7. Add glycerin and flavors, mix approximately 3 minutes.

| Fat Blend | |
|---|---|
| Ingredient | % |
| Partially Hydro. Coconut Oil - fat | 47.60% |
| Lecithin | 2.40% |
| Milk Solids | 15.00% |
| Cocoa Powder | 35.00% |
| Total | 100.00% |

Example 2

| Fruit Flavor Fiber Chew | | |
|---|---|---|
| Piece Breakdown | | |
| Ingredient | Amt/Pc | PC % |
| 6X Sugar | 0.309 | 6.71% |
| Sucrose | 0.470 | 10.23% |
| Corn Syrup 42 DE | 0.707 | 15.36% |
| Fiber | 2.000 | 43.48% |
| Water | 0.423 | 9.19% |
| Sucralose | 0.001 | 0.01% |

| Formulation Fruit | | |
|---|---|---|
| Batch Formula | | |
| Ingredient | Amt. (lbs) | % |
| 6X Sugar | 94.20 | 6.713% |
| Syrup Blend | 661.60 | 47.146% |
| Water | 0.00 | 0.000% |
| Glycerine 99% | 59.60 | 4.247% |
| Artificial Sweetener | 0.03 | 0.002% |
| Sucralose | 0.18 | 0.013% |
| Fruit Flavor | 4.90 | 0.349% |
| Acid | 11.90 | 0.848% |
| Color | 1.1 | 0.079% |
| Fat Blend | 133.80 | 9.535% |
| Corn Starch | 0.00 | 0.000% |
| Fiber | 436.00 | 31.069% |

| Fruit Flavor Fiber Chew | | |
|---|---|---|
| Total | 1403.31 | 100.000% |

| Syrup Blend | | |
|---|---|---|
| Ingredient | Amt. | Wet % |
| Liquid Sucrose | 246.09 | 25.82% |
| Corn Syrup 42 DE | 306.91 | 32.20% |
| Water | 200 | 20.99% |
| Fiber | 200 | 20.99% |
| Total | 953 | 100.00% |

| Fat Blend | |
|---|---|
| Ingredient | % |
| Partially Hydro. Coconut Oil | 90.00% |
| Lecithin | 10.00% |
| Total | 100.00% |

What is claimed is:

1. A method for making a chewy confectionary product having a high fiber content, the method comprising:
   mixing dietary fiber, water, and sweetener selected from the group consisting of corn syrup, sweetener other than from corn syrup, sugar alcohols and mixtures thereof, corn syrup to provide a fibrous/sweetened aqueous slurry having from 60 to 74 weight percent solids, and from 25 to 40 weight percent fiber to provide a fibrous/sweetened slurry;
   heating the fibrous/sweetened slurry to hydrate the fiber and to remove from 10 to 20 weight percent water from the fibrous/sweetened slurry provide a cooked slurry having at least about 78 weight percent solids; and
   adding at a temperature of at least about 100° F. additional fiber, additional solids and at least about 3 weight percent humectant to the cooked slurry to provide a chewy confectionary product having at least 42 weight percent fiber and at least 88 weight percent solids, the addition of the additional fiber and solids at a temperature of the at least about 100° F. to substantially preclude formation of a crystalline matrix of sugar, corn syrup and fiber.

2. The method as recited in claim 1 wherein the sweetener includes a blend of corn syrup and sweetener other than corn syrup.

3. The method as recited in claim 2 wherein the additional fiber and additional solids are added to provide a chewy confectionary product having from 88 to 94 weight percent solids and from about 42 to 60 weight percent fiber.

4. The method as recited in claim 2 wherein the additional fiber, the additional solids, the humectant, and fat are added to provide a chewy confectionary product having 10 to 20 weight percent corn syrup solids, 5 to 20 weight percent sweetener other than from corn syrup solids, 42 to 60 weight percent fiber, 6.5 to 10 weight percent fat, 3 to 6 weight percent humectant, and 88 to 94 weight percent solids.

5. The method as recited in claim 3 wherein the heating of the fibrous/sweetened slurry is at 221° F. to 239° F. to remove the 10 to 20 weight percent water from the fibrous/sweetened slurry and the additional solids and additional fiber are added at a temperature in the range of from about 110° F. to about 140° F.

6. The method as recited in claim 4 wherein the heating of the fibrous/sweetened slurry is at 221° F. to 239° F. to remove the 10 to 20 weight percent water from the fibrous/sweetener slurry and the additional solids and additional fiber are added at a temperature in the range of from about 110° F. to about 140° F.

7. A method for making a chewy confectionary product having a high fiber content, the method comprising:
mixing corn syrup, sweetener, fiber and water, to provide an aqueous fibrous/sweetened slurry having from about 25 to 40 weight percent fiber, 60 to 75 weight percent corn syrup and other sweetener, corn syrup comprising from 50 to about 70 weight percent of the corn syrup sweetener combination, the aqueous fibrous/sweetener slurry having form 60 to 74 weight percent solids;
continuously moving the aqueous fibrous/sweetened slurry into a cooker where the slurry is heated to 221° F. to 239° F. for a time effective to remove 10 to 20 weight percent water from the fibrous/sweetened slurry to provide a cooked slurry having from about 80 to about 88 weight percent solids;
continuously moving the cooked slurry from the cooker to cool the cooked slurry to not less than from about 149° F. to about 180° F. to provide a cooled cooked slurry; and
mixing the cooled cooked slurry with additional fiber, additional solids and at least about 3 weight percent humectant at least about 100° F. to provide a chewy confectionary product having at least 42 weight percent fiber and at least 88 weight percent solids.

8. The method as recited in claim 7 wherein the chewy confectionary product includes 88 to 94 weight percent solids.

9. The method as recited in claim 7 wherein the additional solids comprise sweetener solids selected from the group consisting of corn syrup and sweetener other than corn syrup blended into the cooled cooked slurry to provide the chewy confectionary product such that it has about 42 to about 60 weight percent fiber and from 88 to about 94 weight percent solids.

10. The method as recited in claim 7 wherein the additional solids comprise sweetener solids selected from the group consisting of corn syrup and sweetener other than corn syrup blended into the cooled cooked slurry to provide the chewy confectionary product such that it has 10 to 20 weight percent corn syrup solids, 5 to 20 weight percent sweetener other than from corn syrup solids, 42 to 60 weight percent fiber, 6.5 to 10 weight percent fat, 3 to 6 weight percent humectant, and 88 to 94 weight percent solids.

11. The method as recited in claim 7 wherein the additional solids and additional fiber are added at a temperature in the range of from about 110° F. to about 140° F.

12. The method as recited in claim 10 wherein the additional solids and additional fiber are added at a temperature in the range of from about 110° F. to about 140° F.

13. A method for making a chewy confectionary product having a high fiber content, the method comprising:
mixing dietary fiber, water, and sweetener selected from the group consisting of corn syrup, sweetener other than from corn syrup, sugar alcohols and mixtures thereof, corn syrup to provide a fibrous/sweetened aqueous slurry having from 60 to 74 weight percent solids, and from 25 to 40 weight percent fiber to provide a fibrous/sweetened slurry;
heating the fibrous/sweetened slurry to hydrate the fiber and to remove from 10 to 20 weight percent water from the fibrous/sweetened slurry provide a cooked slurry having at least about 78 weight percent solids; and
adding at a temperature of from about 110° F. to about 140° F. additional fiber, additional solids and at least about 3 weight percent humectant to the cooked slurry to provide a chewy confectionary product having at least 42 weight percent fiber and at least 88 weight percent solids.

14. The method as recited in claim 13 wherein the additional solids comprise sweetener solids selected from the group consisting of corn syrup and sweetener other than corn syrup blended into the cooled cooked slurry to provide the chewy confectionary product such that it has about 42 to about 60 weight percent fiber and from 88 to about 94 weight percent solids.

* * * * *